United States Patent Office 3,228,967
Patented Jan. 11, 1966

3,228,967
PROCESS FOR THE DIRECT EPOXIDATION OF OLEFINS WITH MOLECULAR OXYGEN
Stanley L. Reid, St. Louis, and Dexter B. Sharp, Creve Coeur, Mo., assignors to Monsanto Company, St. Louis, Mo., a corporation of Delaware
No Drawing. Filed June 29, 1962, Ser. No. 206,160
3 Claims. (Cl. 260—348.5)

This invention is directed to a new and improved process for the preparation of olefin oxides. It is further directed to an improved solvent for use as an oxidation medium for the preparation of olefin oxides by the action of molecular oxygen upon olefins.

Still more particularly this invention relates to a process for the direct epoxidation of olefins with molecular oxygen in a solvent comprising acetone.

Olefin oxides are extremely useful articles of commerce. They are used as starting materials for the preparation of antifreeze compositions, humectants, pharmaceutical preparations, cosmetic formulations, as monomers for the preparation of polymers useful in preparing polyurethanes, and the like. Notable among these epoxides are ethylene oxide and propylene oxide. Currently these are prepared by a vapor phase catalytic method and by the classic, two-step chlorohydrin route, respectively. The vapor phase process, insofar as industrial production of epoxides is concerned, is confined to the preparation of ethylene oxide. Higher olefins have yet to be used in a vapor phase catalytic process to give economic production of the corresponding oxides. The older chlorohydrin route is the industrial process which supplies the largest quantities of propylene oxide for commerce. This process is suitable for conversion of ethylene and propylene to their corresponding epoxides, but higher olefins are not particularly adaptable to the chlorohydrin route.

Still a third process for preparation of olefin oxides is that involving peracetic acid oxidation of olefins to the corresponding oxides. This process appears to have wider application and greater versatility insofar as olefin structure is concerned than do the first two methods mentioned. It apparently proceeds by an ionic mechanism, and the rate of epoxidation using peracetic acid is characteristic of the structure of the olefin. Highly substituted ethylenes, for example tetramethylethylene and trimethylethylene, react smoothly and rapidly with peracetic acid to give the corresponding epoxides. However, ethylenic compounds having much lower degrees of substitution about the ethylene group, for example ethylene and propylene, by virtue of the ionic nature of the reaction, react sluggishly with peracetic acid and the rate of formation of the corresponding epoxides is very slow.

Nevertheless, each of these aforementioned processes has inherent disadvantages. For example, vapor phase catalytic oxidation of ethylene to ethylene oxide requires large volume equipment and the handling of tremendous quantities of potentially explosive mixtures of ethylene and oxygen. The second process, exemplified by the chlorohydrin route for propylene oxide, essentially involves a two-step process and, in addition, chlorinated compounds are by-products in this process. The third process, involving the peracetic acid oxidation of olefins to epoxides is potentially hazardous if relatively large quantities of peracetic acid are to be used.

There are scattered references to still a fourth method of preparing olefin oxides, namely, the liquid phase oxidation of olefins with molecular oxygen. Several of these are restrictive in the sense that specific limitations are incorporated in each method. For example, catalysts or other additives, or secondary treatment of the oxidation mixtures with basic materials are essential features of these methods.

Since the present invention is concerned with a novel liquid phase epoxidation system employing oxygen as the oxidant, the discussion below will be directed to typical existing prior art schemes for liquid phase olefin oxidations. These prior art processes describe a number of approaches comprising the proper balancing of a series of reaction variables or system compositions in order to obtain the desired olefin oxide. For example, various specific oxidation catalysts or catalyst-solvent systems have been described (U.S. Patents 2,741,623, 2,837,424, 2,974,-161, and 2,985,668); another approach is the incorporation of oxidation anticatalysts which retard certain undesirable side reactions (U.S. Patent 2,279,470); still another approach emphasizes the use of water-immiscible hydrocarbon solvents alone, or in the presence of oxidation catalysts and/or polymerization inhibitors such as nitrobenzene (U.S. Patent 2,780,635) or in the presence of saturated hydrocarbons (U.S. Patent 2,780,634); another method describes the use of neutralizers such as alkali metal and alkaline earth methal hydroxides, or salts of these metals (U.S. Patent 2,838,524); another approach involves the use of certain catalysts in an alkaline phase (U.S. Patent 2,366,724), or a liquid phase maintained at specified critical pH values (U.S. Patent 2,650,927); and still other approaches emphasize criticality of oxygen pressure (U.S. Patent 2,879,276), or the geometry of the reaction zone (U.S. Patents 2,530,509 and 2,977,374). The foregoing represent prior art approaches to problems encountered in the utilization of a liquid phase oxidation process to obtain olefin oxides.

It is the primary object of the instant invention to provide a superior process for commercial production of olefin oxides which process is free of numerous limitations recited in prior art processes.

A further object of this invention is to provide a liquid phase process for the production of olefin oxides which is not dependent upon the presence or absence of any catalyst; neither is it dependent upon the presence of water-immiscible solvents nor upon solvents containing added buffers, acid neutralizers, or other additives; nor is it dependent upon secondary treatments with alkaline materials to remove acidic components; nor is it dependent upon the presence of saturated compounds, initiators or anticatalysts; further, it is not dependent upon critical reactor geometries, temperatures, pressures, pH level, oxygen concentration, flow rates, or reactant ratios.

It is a further object of this invention to provide a new solvent for direct epoxidation of olefins.

It is an additional object of this invention to provide a new process which is applicable to a wide range of olefin structures; that is, it is not limited to a single olefin or two, but rather, has a broad application over a large class of unsaturated compounds.

It is an additional object of this invention to provide a new process which requires relatively small scale equipment and does not involve the explosive hazards associated with certain of the prior art processes, e.g., the vapor phase process requiring large volume equipment.

Other objects of this invention are to provide a process for production of olefin oxide either in batch or continuous manner by a method which is simple, safe, economical and dependable.

These and other objects of the invention will become apparent to those skilled in the art as the description of the invention herein proceeds.

According to the present invention, it has been discovered that olefins can be oxidized with molecular oxygen to epoxides in high conversions and yields when the oxidation is allowed to proceed in a liquid reaction medium comprising acetone.

The solvent used in the present invention combines essential characteristics and features required for successful solution or liquid phase oxidation, that is, the solvent is essentially chemically indifferent and is oxidatively and thermally stable. Furthermore, the instant solvent is superior to those disclosed in the prior art liquid phase olefin oxidation processes in that it does not require buffers, neutralizers, initiators, inhibitors and/or catalysts in order to utilize the above-mentioned essentials to effect oxidation of the olefin to the olefin oxide in high yield and conversion. The solvents of prior art processes require buffers, neutralizers, initiators, inhibitors and catalysts in order to promote the oxidation of the olefin and combat the deleterious effects of by-products such as acidic components.

It is known that olefin oxidations give, in addition to epoxides, various by-products such as water, formic acid and acetic acid which can be deleterious to the oxidation when present in appreciable quantities; the deleterious effects are thought to arise from reaction of the olefin oxide with these by-products to give corresponding alkylene glycol and/or glycol derivatives, as well as undesired polymeric materials. Prior art methods involve the use of a variety of approaches to counteract these deleterious effects, such as the use of water-immiscible hydrocarbon solvents containing inhibitors or utilized in conjunction with a separate washing step with solutions of basic substances, in effect, processes which require acid removal in order for such water-immiscible hydrocarbon solvents to be useful for olefin oxidation.

It is a primary and surprising feature of the instant invention that the acetone solvent used herein needs no added substances to counteract the deleterious effect of by-product water or acids. By use of acetone a surprisingly substantial quantity of water and organic acids can be tolerated without undue adverse effects upon the course of the olefin epoxidation. Furthermore, acetone used herein as solvent for the oxidation is not water-immiscible, hence, avoids the problems engendered with a two phase reaction system arising from the use of water-immiscible solvents.

It is a further feature of the instant invention that the olefin oxidations proceed at such a rapid rate that the oxygen is quantitatively consumed, hence, accumulation of potentially hazardous explosive mixtures of oxygen and organic materials in the vapor state are avoided.

It is further apparent that there is no criticality insofar as pH value is concerned for this oxidation since appreciable concentrations of acid by-products, for example, up to 20 weight percent of acetic acid, are not particularly deleterious. Hence, the olefin oxidation in acetone proceeds readily over a range of pH's as acidic as pH 4 and in neutral and alkaline ranges.

Substantial evidence exists that these olefin oxidations, for example, propylene to propylene oxide by direct oxidation with molecular oxygen, are propagated by a free radical chain mechanism. Copper and its compounds are strong inhibitors for this propylene oxidation; an inhibition possibly due to a redox reaction of copper with peroxy radicals which interrupts the chain propagation sequence and prevents attainment of a long kinetic chain necessary for reasonable conversion of the olefin. In addition, when free radical inhibitors, that is, anti-oxidants, are added to the reaction mixture, partial or complete inhibition of the olefin oxidation occurs. In the absence of such inhibitors a very rapid, vigorous exothermic oxidation of the olefin occurs in the acetone solvent. Furthermore, the acetone solvent is apparently very resistant to free radical attack and is recovered substantially unchanged. On the contrary, among prior art solvents benzene is an example of a compound which is readily attacked by free radicals giving radicals, in turn, which can react with oxygen to give phenolic or quinonoid-type molecules derived from the benzene. Such derivatives are known to be efficient inhibitors for radical chain oxidations. Thus, when benzene is used as a solvent for an olefin oxidation its susceptibility to free radical attack gives rise to an effect which might be termed auto-inhibition, that is, the rate of oxidation of the olefin decreases with time due to production of antioxidant-type molecules from the benzene solvent. In contrast, the acetone solvent, which has a high order of resistance to radical attack, does not impede the radical chain sequence, hence, the rate of oxidation of the olefin is not affected; the olefin oxidation can proceed to the depletion of either the olefin or the oxygen.

In addition to the foregoing advantages of using acetone as a solvent, acetone appears as a by-product in many olefin oxidations, e.g., it is a by-product in the oxidation of propylene to propylene oxide, hence this by-product acetone can be used to make up possible mechanical losses of solvent during batch or continuous operation.

As will be appreciated in the light of the foregoing discussion, the acetone solvent used in the instant invention constitutes a suitable reaction medium for substantially all olefin oxidations with molecular oxygen to form olefin oxides.

The term "molecular oxygen" as used herein includes pure or impure oxygen as well as gases containing free oxygen, for example, air.

Olefins suitable for use herein preferably include those of the ethylenic and cycloethylenic series up to 18 carbon atoms per molecule, e.g., ethylene, propylene, butenes, pentenes, hexenes, heptenes, octenes, nonenes, decenes, undecenes, dodecenes, pentadecenes, heptadecenes, octadecenes, cyclobutenes, cyclopentenes, cyclohexenes, cyclooctenes, and the like. Of particular interest, utility and convenience are the olefins containing from 2 to 8 carbon atoms. Included are the alkyl-subsituted olefins such as 2-methyl-1-butene, 2-methyl-2-butene, 2-methyl-1-propene, 4-methyl-2-pentene, 2-ethyl-3-methyl-1-butene, 2,3-dimethyl-2-butene and 2-methyl-2-pentene. Other suitable olefinic compounds include butadiene, isoprene, other pentadienes, hexadienes, heptadienes, octadienes, decadienes, octadecadienes, alkyl- and polyalkyl-susbtituted-cycloalkenes and cycloalkadienes, vinyl-substituted cycloalkenes and benzenes, cyclopentadiene, dicyclopentadiene, styrene, methylstyrene, alkylmethylstyrene, and other vinyl-substituted aromatic systems. Another class of olefinically unsaturated compounds which are of interest in this direct epoxidation to epoxides are the unsaturated macromolecules, that is, the rubbers, such as butadiene polymers, isoprene polymers, butadiene-styrene copolymers, isobutylene-isoprene copolymers, chloroprene polymers and other copolymers comprising dienic and vinyl comonomers incorporated therein, and the like.

Particularly suitable olefin feed stocks contemplated in the instant invention include the pure olefin or mixtures of olefins or olefin stocks containing as much as 50% of saturated compounds. Olefinic feed materials include those formed by cracking petroleum stock such as hydrocarbon oils, paraffin wax, lubricating oil stocks, gas oils, kerosenes, naphthas and the like.

The reaction temperatures used in liquid phase olefin oxidations using the acetone solvent of the instant invention are subject only to a lower limit below which the oxidation either proceeds too slowly or follows a course other than that leading to olefin oxides. The upper limit of the temperature range is that which may be termed a threshold above which substantial decomposition, polymerization or excessive oxidative side reactions occur, thereby leading to undesirable side reactions and products which substantially detract from the yield of the olefin oxide. In general, temperatures of the order of 50° C.–400° C. are contemplated. It is expedient to maintain temperatures at a sufficiently high level to insure thermal decomposition of hazardous peroxides which may form and accumulate to the point of unsafe operation. Within this general temperature range preferred temperatures are within 125°–250° C.

Subatmospheric, atmospheric or superatmospheric pressures are suitable for use in the instant invention, that is, pressure ranging from 0.2 to 350 atmospheres. Usually, the oxidation reaction is facilitated by the use of higher pressures, hence, a preferred pressure range is from 5 to 200 atmospheres. Pressures herein delineated and temperatures described previously will generally be selected, of course, depending upon the characteristics of the individual olefin which is to be oxidized to the olefin oxide, but the combination of temperatures and pressures will be such as to maintain a liquid phase. Olefin oxidations in the instant acetone solvent are autocatalytic, that is, they are free radical chain reactions which proceed very rapidly after a brief induction period and give remarkably constant product composition over wide variations of conditions. A typical olefin oxidation, for example, propylene in batch operation, requires from about 1 to 20 minutes. Similar, or faster, reaction rates occur in continuous operation. The reaction vessel for conducting this olefin oxidation can be made of materials which may include almost any kind of ceramic material, porcelain, glass, silica, various metals, such as stainless steels, aluminum, silver and nickel, which vessels do not necessarily have to conform to any particular geometric design. It should be noted in the instant invention that no added catalyst are necessary and no reliance is placed upon catalytic activity of the walls of the reactor or reactor components.

Various means known to the art can be utilized for establishing intimate contact of the reactants, i.e., olefin and molecular oxygen in the solvent, for example, by stirring, sparging, shaking, vibration, spraying or other vigorous agitation of the reaction mixture. The vigorous agitation of the reaction mixture effects not only intimate contact of olefin and oxygen, but also facilitates removal of the heat of reaction to suitably oriented heat exchangers. It is to be noted, also, that the exothermic nature of the olefin oxidation is such that very small or negligible amounts of heat need be applied to the reaction system in order to maintain the desired temperature of operation, hence, reaction temperature is adequately maintained by suitable design and proper use of heat exchange components.

As noted above, no added catalysts are required in the present invention. The usual oxidation catalysts can be tolerated although usually no significant benefit accrues from their use because the olefin oxidations proceed in such facile manner in the acetone solvent of the instant invention. Oxidation catalysts such as platinum, seleneum, vanadium, manganese, silver, cobalt, cadmium and mercury in metallic or compound form, preferably as oxide or carbonate, or as soluble acetates or carboxylates, may be present singly or mixed in gross form, supported or unsupported, or as finely-divided suspensions, or in solution in the acetone solvent.

Since olefin oxidations according to this invention proceed at such a rapid rate after a brief induction period it should also be noted that no initiators, accelerators, or promoters are required; these may be used, however, to shorten or eliminate the brief induction period after which no additional initiator, promoter or accelerator need be added to maintain the reaction. Initiators, accelerators or promoters suitable for shortening the induction period include organic peroxides such as benzoyl peroxide, tertiary-butyl hydroperoxide, di-tertiary-butyl peroxide, inorganic peroxides such as hydrogen and sodium peroxides, organic peracids such as peracetic and perbenzoic acid, or various other peroxidic derivatives such as the hydroperoxide addition products of ketones and aldehydes. Also useful as initiators, promoters, or accelerators for the purpose of reducing the time of the induction period, but following which induction period no more need be added, are readily oxidizable materials such as aldehydes, for example, acetaldehyde, propionaldehyde, isobutyraldehyde and the like, and ethers such as diethyl ether and di-isopropyl ether.

The reaction mixtures to be used in carrying out the process of the instant invention may be made up in a variety of ways. Exemplary combinations are the olefin and oxygen premixed with solvent and introduced into the reactor. Or the olefin may be premixed with the solvent, suitably up to 45% by weight, preferably, from 5 to 30% by weight of the solvent in the reactor, and the oxygen added thereto. The oxygen-containing gas may be introduced into the olefin-solvent mixture incrementally or continuously. Or, the reactor may be charged with solvent and the olefin and oxygen gas may be introduced simultaneously through separate feed lines into the body of the solvent in a suitable reaction vessel. In one embodiment the olefin and oxygen-containing gas mixture is introduced into the solvent in a continuously stirred reactor, under the conditions of temperatures and pressures selected for this particular olefin. Suitable olefin to oxygen volumetric ratios are within the range of 1 to 5 up to 15 to 1. Feed rates, generally, of oxygen or oxygen-containing gas may vary from 0.5 to 1500 cubic feet per hour or higher and will largely depend upon reactor size with respect to production quantity desired. The oxygen input is adjusted in such manner as to allow virtually complete usage of oxygen, thereby keeping the oxygen concentration in the off-gas above the reaction mixture below about 1%. Obviously this safeguard is necessary in order to prevent a hazardous concentration of explosive gases, as is well known in the art. Proper adjustment of feed rates is of importance in order that the olefin not be stripped from the liquid phase, thus reducing its concentration, hence reducing the rate of oxidation of the olefin which would result in lower conversions per unit time of olefin to olefin oxide. The acetone solvent used herein represents the preponderant constituent in the reaction mixture, with respect to all other constituents, including reactants, oxidation products and by-products. By preponderant is meant enough solvent is always present to exceed the combined weight of all other constituents. In other words, the reaction mixture comprises major amounts of the acetone solvent and minor amounts of all other constituents with respect thereto.

The oxidation products are removed from the reactor as a combined liquid and gaseous effluent containing the olefin oxide, unreacted components and by-products, by properly adjusting conditions of temperature and pressure and by suitable adjustment of some let-down system; or the entire reaction mixture containing the oxidation products is removed from the reactor; conventional techniques for separation of desired products including distillation, fractionation, extraction, crystallizations and the like, are employed to effect separation of the desired olefin oxide. One continuous procedure comprises continually removing the gaseous and liquid effluent from the reaction zone to a distillation column and removing various fractions of solvent, unconsumed reactants and of products contained therein, in effect, a fractionation to obtain the olefin oxide. From such suitable fractionation process acetone solvent is recovered and is recycled to the reaction zone.

The invention will be more fully understood by reference to the illustrative specific embodiments presented below.

A modified cylindrical Hoke high pressure vessel is employed for the batch-type oxidations described below. A high pressure fitting was welded to the cylindrical wall of the vessel near one end to serve as gas inlet, and a high-pressure block valve with rupture disc was attached to this fitting with a one-quarter inch high-pressure tubing "goose-neck." A thermocouple sheathed in stainless steel was sealed into one end-opening of the vessel. The solvent and initiator (if any employed) are then charged through the other end-opening which is then sealed with the plug. The olefin is then charged to the desired amount, as determined by weight difference, that is, the olefin, if normally gaseous, is charged under pressure and, if normally liquid, may be charged into the end opening along with solvent and the amount of charge determined by the difference in weights of the reaction vessel before and after charging. The charged vessel is affixed to a bracket attached to a motor driven eccentric which provides vertical vibrational agitation. The cylindrical Hoke vessel is clamped in a horizontal attitude (with respect to the axis of the cylinder) in order that maximum agitation of contents ensues. This vibrating reaction vessel can be immersed consecutively in a hot bath for heating to reaction temperatures, removed therefrom, then immersed in a cold bath to quench to room temperature.

*Example 1*

To a 150-ml. pressure reaction vessel was charged 20.00 g. of acetone, 0.25 g. of acetaldehyde and 8.96 g. of propylene. The sealed pressure vessel was attached to the agitator assembly of the oxidation apparatus and immersed in the hot polyethylene glycol bath maintained at a temperature of 183° C., whereupon an autogenous pressure of 580 p.s.i.g. developed. Oxygen was introduced to the system to give 20 p.s.i.g. partial pressure, that is, 600 p.s.i.g. total pressure, then gradual increase in oxygen was effected to give a final pressure of 725 p.s.i.g. total pressure. The oxidation was allowed to proceed until the reaction rate had diminished, then the oxygen was turned off and the pressure reaction vessel was immersed in a cold water bath. The vessel was removed and the contents analyzed by vapor phase chromatography. These analyses indicated a 17% conversion of propylene to oxygenated products, among which propylene oxide was obtained in 30% yield.

*Example 2*

This example illustrates that acetone containing substantial amounts of acidic material, that is, acetic acid, is a superior solvent for liquid phase oxidations of olefins even in the absence of oxidation catalysts and basic materials. And, for these reasons, acetone is superior to prior art solvents for the oxidation of olefins, e.g., propylene to propylene oxide, in that the latter solvents require basic substances or a separate treatment to neutralize or remove acidic materials in addition to oxidation catalysts in order that they may be used as solvents for this oxidation. To a 150-ml. pressure reaction vessel was charged 20.08 g. of acetone, 10 drops of acetaldehyde, 2.0 g. of acetic acid, and 9.07 g. of propylene. The sealed, charged reaction vessel was attached to the agitator assembly of the oxidation apparatus and immersed in a hot (175° C.) polyethylene glycol bath. Oxygen was introduced into the system whereupon the oxidation commenced almost immediately and was allowed to proceed for 10 minutes. The oxygen was turned off, the reaction vessel was immersed in a cold water bath, and then removed from the apparatus. The contents were analyzed by vapor phase chromatography and showed a 39.6% conversion of propylene to oxygenated products among which propylene oxide was obtained in 25.3% yield.

*Example 3*

To a 150 ml. pressure reaction vessel was charged 19.92 g. of acetone, 4.0 g. of acetic acid, 10 drops of acetaldehyde, and 10.59 g. of propylene. The sealed reaction vessel was attached to the agitator apparatus used for oxidations, and immersed in a hot polyethylene glycol bath maintained at a temperature of 175°. Oxygen was introduced whereupon the oxidation commenced almost immediately and was allowed to proceed for 10 minutes. The oxygen was turned off and the reaction vessel was immersed in a cold water bath, then removed and analyzed by vapor phase chromatography. These analyses indicate a 37.4% conversion of propylene to oxygenated products, among which propylene oxide was obtained in 23.8% yield.

In the preceding two examples, the quantity of acetic acid charged is substantially greater than that which normally develops during the propylene oxidation, and both examples amply illustrate the utility of acetone as a solvent for this oxidation since the added acetic acid apparently has little or only a minor deleterious effect upon the oxidation.

*Example 4*

This example illustrates the superiority of acetone over benzene, as a typical prior art solvent as an olefin oxidation medium, the latter even containing a silver benzoate oxidation catalyst. To a 150 ml. pressure reaction vessel was charged 20.36 g. of benzene, 46 mg. of silver benzoate, and 12.85 g. of propylene. To this vessel was charged with 100 p.s.i.g. of nitrogen. The vessel was attached to the agitator assembly of the oxidation apparatus and immersed in a 200° C. polyethylene glycol bath, whereupon an autogenous pressure of 800 p.s.i.g. was developed. When temperature equilibrium had been reached, 200 p.s.i.g. oxygen overpressure was added to the pressure reaction vessel, but in this case a noticeable pressure drop occurred only after 6 minutes, after which a 275–300 p.s.i.g. oxygen partial pressure was maintained in the pressure reaction vessel. The oxidation was allowed to proceed for 15 minutes, then the oxygen is turned off and the vessel was immersed in a cold water bath. The vessel was removed and the gaseous and liquid phases were analyzed by vapor phase chromatographic means. These analyses indicated a 39% conversion of propylene to oxygenated products, among which propylene oxide was obtained in 6.5% yield. Thus, in spite of the presence of the catalytic material, silver benzoate, benzene, a common solvent for propylene oxidation disclosed in the prior art, is decidedly inferior to acetone as a solvent for this direct epoxidation reaction.

*Example 5*

This example describes a continuous oxidation of propylene to propylene oxide employing acetone as the solvent. The apparatus employed consisted essentially of 1 gal. autoclave. of the Magne Dash-type, with feed streams for propylene, oxygen and solvent entering the bottom of the reactor, and with a product overflow pipe which allowed simultaneous withdrawal of liquid and vapor product streams to a let-down system from which gas phase and liquid phase samples were withdrawn for analyses.

Propylene, solvent, and oxygen were fed to the reaction autoclave until a steady state oxidation was obtained. At this steady state propylene was being fed at a rate of 441 g. per hour, acetone was being fed at a rate of 3021 g. per hour and oxygen was being fed at a rate of 360 g. per hour. The propylene consumed amounted 64% of that charged, and 99.5% of the oxygen was consumed. Analyses of the product showed a 32.1% yield of propylene oxide.

*Example 6*

In the continuous oxidation apparatus described above, except that the 1-gallon Magne Dash reactor was replaced by a one-liter autoclave, the following continuous run with acetone as solvent was made:

Propylene, solvent and oxygen were fed to this reactor until a steady state was achieved. At steady state conditions, 452 g. of propylene, 2918 g. of acetone, and 268 g. of oxygen were fed to the reactor each hour. The percent conversion of propylene to oxygenated products was 47.6, and 96.1% of the oxygen was consumed. A 43.9% yield of propylene oxide was obtained.

*Example 7*

To a Hoke pressure reaction vessel is charged 25 g. of acetone, about 8 g. of cyclohexene, and 0.13 g. of acetaldehyde; the acetaldehyde is used merely to reduce the brief induction period further, no additional acetaldehyde is required for this oxidation. The pressure vessel is affixed to the oxidation apparatus and immersed in a hot polyethylene glycol bath maintained at a temperature of 160° C., whereupon an autogenous pressure of 200 p.s.i.g. develops. Then temperature equilibrium has been reached, oxygen is introduced into the vessel to give a total pressure of 100 p.s.i.g. above the autogenous pressure. The oxidation commences immediately and is allowed to proceed for about 7 minutes. The oxygen is turned off and the reaction vessel is immersed in a cold water bath, removed from the oxidation apparatus, and the contents removed and subjected to vapor phase chromatographic analysis. These analyses indicate that a 48% conversion of cyclohexene to oxygenated products has occurred among which products cyclohexene oxide is obtained in approximately 23% yield.

*Example 8*

To a Hoke pressure reaction vessel is charged 25 g. of acetone, about 7 g. of a branched nonene, known to the trade as propylene trimer or tripropylene, and 0.13 g. of acetaldehyde; the acetaldehyde is added to serve as an induction period time-reducer and no additional acetaldehyde need be added to maintain the reaction. The vessel is sealed, placed upon the agitator apparatus and immersed in a hot polyethylene glycol bath maintained at a temperature of 140° C. When temperature equilibrium is reached within the vessel an autogenous pressure of 190 p.s.i.g. develops, whereupon oxygen is introduced to the vessel at a pressure representing a 100 p.s.i.g. overpressure above the autogenous pressure. The oxidation commences immediately and is allowed to proceed for approximately 10 minutes, whereupon the oxygen is turned off, and the vessel is immersed in the cold water bath, and when cooled is removed and the contents subjected to vapor phase chromatographic analysis. These analyses indicate that 47% conversion of the branched nonene occurs to oxygenated products, among which branched nonene oxide is obtained in about 38% yield.

*Example 9*

To the pressure reaction vessel described previously is charged 25 g. of acetone, and about 8 g. of vinylcyclohexene, along with 0.13 g. of acetaldehyde initiator. The reaction vessel is mounted on the agitator apparatus, immersed in a hot polyethylene glycol bath maintained at a temperature of 160° C. whereupon, when temperature equilibrium is reached, an autogenous pressure of 250 p.s.i.g. is obvserved. Oxygen is introduced to give a 130 p.s.i.g. overpressure above the autogenous pressure developed during heat-up. Oxidation commences immediately and is allowed to proceed for about 10 minutes. The oxygen is turned off and the pressure reaction vessel is immersed in a cold water bath, removed from the apparatus, and the contents are analyzed by vapor phase chromatographic methods. These VPC analyses indicate that 43% of the vinylcyclohexene has been converted to oxygenated products, among which vinylcyclohexene oxide is obtained in about 18% yield.

*Example 10*

To a pressure reaction vessel as described previously, 25 g. of acetone, about 6 g. of styrene, and 0.13 g. of acetaldehyde is charged. The vessel is sealed, clamped to the agitator assembly, and immersed in a hot polyethylene glycol bath maintained at 160° C. When temperature equilibrium is attained, an autogenous pressure of 350 p.s.i.g. develops whereupon oxygen is introduced in the amount given 100 p.s.i.g. overpressure above the autogenous pressure. Oxidation commences immediately and is allowed to proceed for about 6 minutes. The oxygen is shut off and the vessel is immersed in the cold water bath, then removed from the apparatus. The contents are analyzed by vapor phase chromatography. These analyses indicate a 46% conversion of styrene to oxygenated products among which styrene oxide is obtained in approximately 30% yield.

*Example 11*

To a Hoke pressure reaction vessel as described previously is charged 25 g. of acetone, about 8 g. of isobutylene, and 0.13 g. of acetaldehyde initiator. The vessel is sealed and placed on the agitator assembly of the oxidation apparatus and immersed in a polyethylene glycol bath maintained at a temperature of 160° C. When temperature equilibrium is reached, an autogenous pressure of 310 p.s.i.g. develops, whereupon oxygen is introduced to give 150 p.s.i.g. overpressure above the autogenous pressure. The oxidation commences immediately and proceeds in rapid fashion for about 6 minutes. At this time the oxygen is turned off, and the vessel is immersed in the cold water bath. The reaction vessel is removed from the apparatus, and the contents are analyzed by vapor phase chromatographic analysis methods. These analyses indicate a 33% conversion of isobutylene to oxygenated products, among which isobutylene oxide is obtained in about 27% yield and acetone is obtained in about 35% yield.

*Example 12*

To a pressure reaction vessel described previously is charged 25 g. of acetone, about 10 g. of soybean oil and 0.13 g. of acetaldehyde initiator. The pressure vessel is sealed and clamped to the agitator apparatus and immersed in a hot polyethylene glycol bath maintained at a temperature of 160° C. An autogenous pressure of 200 p.s.i.g. develops when temperature equilibrium is obtained. Oxygen is introduced into the pressure reaction vessel to give a 100 p.s.i.g. overpressure above the autogenous pressure. Oxidation commences immediately and is allowed to proceed for 10 minutes. The oxygen is turned off and the pressure reaction vessel is immersed in a cold water bath, then removed and the contents analyzed for oxirane oxygen. The soybean oil is converted to a product containing about 1.0% oxirane oxygen. Variations and modifications of the instant invention will occur to those skilled in the art without departing from the spirit and scope thereof.

We claim:

1. Process for the preparation of olefin oxides which comprises oxidizing an expoxidizable olefinically unsaturated hydrocarbon compound having up to 18 carbon atoms with molecular oxygen at a temperature within the range of from 50° C. to 400° C. and pressures within the range of from 0.2 to 350 atmospheres in a liquid reaction medium consisting essentially of major amounts of acetone and in the absence of added catalysts.

2. Process according to claim 1 wherein said olefinically unsaturated compound is styrene.

3. Process for the preparation of propylene oxide which comprises oxidizing propylene with molecular oxygen at a temperature within the range of from 125° C. to 250° C. and pressures within the range of from 5 to 200 atmospheres in a liquid reaction medium consisting essentially of major amounts of acetone and in the absence of added catalysts.

(References on following page)

References Cited by the Examiner

UNITED STATES PATENTS

| | | | |
|---|---|---|---|
| 2,316,604 | 4/1943 | Loder et al. | 260—484 |
| 2,475,605 | 7/1949 | Prutton et al. | 260—451 |
| 2,613,223 | 10/1952 | Young | 260—348.5 |
| 2,784,202 | 3/1957 | Gardner et al. | 260—348.5 |

FOREIGN PATENTS

| | | |
|---|---|---|
| 886,164 | 1/1962 | Great Britain. |

OTHER REFERENCES

Bergmann, "The Chemistry of Acetylene and Related Compounds," page 80, Interscience Publishers, Inc., New York (1948).

Durrans, T. H., "Solvents," 7th ed. (1957), pp. IV, 119–127.

WALTER A. MODANCE, *Primary Examiner.*

NICHOLAS S. RIZZO, *Examiner.*